US008671076B2

(12) United States Patent
Price et al.

(10) Patent No.: US 8,671,076 B2
(45) Date of Patent: Mar. 11, 2014

(54) DATABASE RECOVERY USING LOGS APPLIED TO CONSISTENT COPIES

(75) Inventors: Thomas G. Price, Austin, TX (US); Stanley J. Dee, Austin, TX (US); Michael S. Murley, Austin, TX (US); Richard T. Weaver, Spring, TX (US)

(73) Assignee: BMC Software, Inc., Houston, TX (US)

( * ) Notice: Subject to any disclaimer, the term of this patent is extended or adjusted under 35 U.S.C. 154(b) by 1824 days.

(21) Appl. No.: 11/745,971

(22) Filed: May 8, 2007

(65) Prior Publication Data

US 2008/0281865 A1  Nov. 13, 2008

(51) Int. Cl.
G06F 7/06 (2006.01)

(52) U.S. Cl.
USPC ........................................................ 707/649

(58) Field of Classification Search
None
See application file for complete search history.

(56) References Cited

U.S. PATENT DOCUMENTS

| | | | | |
|---|---|---|---|---|
| 5,241,668 A * | 8/1993 | Eastridge et al. | ................ | 714/5 |
| 5,241,670 A * | 8/1993 | Eastridge et al. | ................ | 714/1 |
| 5,263,154 A * | 11/1993 | Eastridge et al. | ................ | 714/6 |
| 5,379,412 A * | 1/1995 | Eastridge et al. | ............ | 711/162 |
| 5,381,545 A * | 1/1995 | Baker et al. | ................... | 714/19 |
| 5,592,618 A * | 1/1997 | Micka et al. | ................... | 714/54 |
| 5,594,900 A * | 1/1997 | Cohn et al. | ................... | 707/202 |
| 5,806,076 A * | 9/1998 | Ngai et al. | ................... | 707/203 |
| 5,835,953 A * | 11/1998 | Ohran | ........................ | 711/162 |
| 5,845,292 A * | 12/1998 | Bohannon et al. | ............ | 707/202 |
| 6,065,018 A * | 5/2000 | Beier et al. | ................... | 707/202 |
| 6,078,932 A * | 6/2000 | Haye et al. | ................... | 707/204 |
| 6,105,030 A * | 8/2000 | Syed et al. | ..................... | 707/10 |
| RE37,038 E * | 1/2001 | Eastridge et al. | ................ | 714/5 |
| 6,202,136 B1 | 3/2001 | Wikle et al. | | |
| RE37,601 E * | 3/2002 | Eastridge et al. | ................ | 714/6 |
| 6,385,613 B1 * | 5/2002 | Grewell et al. | ................... | 707/8 |
| 6,604,118 B2 | 8/2003 | Kleiman et al. | | |
| 6,618,794 B1 | 9/2003 | Sicola et al. | | |
| 7,024,528 B2 | 4/2006 | LeCrone et al. | | |
| 7,107,294 B2 * | 9/2006 | Romanufa et al. | ............ | 707/202 |
| 7,133,884 B1 | 11/2006 | Murley et al. | | |
| 7,769,718 B2 * | 8/2010 | Murley et al. | ................ | 707/649 |
| 2003/0093444 A1 | 5/2003 | Huxoll | | |
| 2004/0139367 A1 | 7/2004 | Boyd et al. | | |
| 2004/0181560 A1 * | 9/2004 | Romanufa et al. | ............ | 707/202 |
| 2004/0260896 A1 | 12/2004 | Werner et al. | | |
| 2005/0289533 A1 | 12/2005 | Wang et al. | | |
| 2007/0022146 A1 * | 1/2007 | Murley et al. | ................ | 707/204 |

OTHER PUBLICATIONS

Murley in view of Mohan, et al., "Aries: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.*

* cited by examiner

Primary Examiner — Hung Q Pham
Assistant Examiner — Hubert Cheung

(57) ABSTRACT

A copy utility creates a copy of source database objects that is transactionally consistent to a consistent point-in-time, and a recovery utility applies log records to the consistent copy to make a resulting image that is updated as of an identified point-in-time (i.e., the current time or a point-in-time after the copy was made). To effectively recover and apply the logs so that no previously in-flight transactions are lost, the copy utility registers a starting point indicating a point-in-time for logs to be applied to the copy and also registers a smallest lock size used to block access to target data when the copy was made. The recovery utility bases its recovery operations using the registered starting point and the smallest lock size when applying log records to the copy so as not to lose any previously in-flight transactions.

35 Claims, 4 Drawing Sheets

DATABASE RECOVERY USING LOGS APPLIED TO CONSISTENT COPIES

FIELD OF THE DISCLOSURE

The subject matter of the present disclosure generally relates to database systems and, more particularly, to generating a consistent copy of database objects without impacting their availability and then recovering an image of those objects to the current time or a point-in-time after the copy was generated by applying logs to the consistent copy.

BACKGROUND OF THE DISCLOSURE

A database is, fundamentally, a computerized record-keeping system in which large amounts of information may be stored in a structured manner for ease of subsequent retrieval and processing. Large databases such as the DB2® database from the International Business Machines Corporation of Armonk, N.Y., are typically managed through a database management system ("DBMS"). A DBMS, in turn, provides four primary functions: management of physical storage; a user interface (e.g., the Structured Query Language, "SQL"); data security (e.g., user passwords and view restriction policies); and (4) data consistency or integrity.

There are two types of consistency—physical and transactional. Physical consistency refers to the integrity between physical pages of storage. For example, index pointers must be consistent with the data pages to which they point, a pointer record and the overflow record it points to on another page must be consistent, an index non-leaf page and the leaf page it points to must be consistent, and any DBMS defined referential integrity constraints established between database objects must be maintained in the face of data updates. Transactional consistency refers to the condition wherein a database's data is consistent across (although not necessarily during) a transaction. A transaction is generally defined as all database operations (e.g., updates) associated with a single logical action. To permit the DBMS to track transactions comprising multiple operations, and to maintain the database's integrity in light of such operations (i.e., transactional consistency), all database operations related to a transaction are grouped into a single unit of work ("UOW"). Until all updates in a UOW are committed (that is, applied to and made part of the database object to which they are directed and such action noted in the DBMS's log files), the UOW is said to be "in-flight."

It is important that when generating a copy of a database (or a portion thereof) the resulting copy is both physically and transactionally consistent. To ensure this consistency, prior art database copy techniques (1) block write-access to the database objects being copied, including all referentially related objects, (2) wait for all in-flight UOWs to complete, and (3) copy the database objects. While this process generates a consistent copy of the database objects as of the time the copy operation was initiated, it prevents users from updating the database objects at least until the in-flight UOWs are complete. This can be a significant drawback for large or complex databases and/or those databases that experience large update volumes.

Techniques for generating point-in-time consistent copies of a database (or portions thereof) are disclosed in U.S. Pat. No. 7,133,884, which is incorporated herein by reference in its entirety. In some situations, users may not effectively be able to apply log records to a consistent copy to recover an image of the database objects to the current time or to a point-in-time after the copy was made. For example, simply applying log records in a normal manner to the consistent copy may be ineffectual because any changes made to database objects by transactions that were in-flight at the time the copy was made may be lost. To overcome this problem, users may need to resort to less than ideal or efficient solutions. For example, users may need to make multiple copies of database objects—one copy for recovering to the point-in-time when the copy was made and another copy for applying log records to recover to the current time or a point-in-time after the copy was made.

The subject matter of the present disclosure is directed to, inter alia, overcoming or at least reducing the effects of one or more of the problems set forth above. For example, the subject matter of the present disclosure can enable recovery to the current time or other point-in-time after a copy was made without having to make multiple copies of the data.

SUMMARY OF THE DISCLOSURE

A copy utility creates a copy of one or more source database objects that is physically and transactionally consistent at a point-in-time. A recovery utility applies log records to the consistent copy to make a resulting image that is updated as of an identified point-in-time (i.e., the current time or an arbitrary but specified point-in-time after the copy was made). To effectively recover and apply log records so that no previously in-flight transactions are lost, the copy utility registers a starting point and a lock size. The starting point indicates a point-in-time for logs to be applied to the copy. The lock size refers to the smallest lock size used to block access to target data when the copy was made. During a recovery operation, the recovery utility uses the registered starting point and the specified lock size when applying log records to the copy so as not to lose any previously in-flight transactions.

DETAILED DESCRIPTION

Techniques (including methods and devices) are described to provide database recovery using a point-in-time consistent copy of one or more database objects and applying log records to that copy to create a resulting image of the database object(s) up to the current time or an arbitrary, but specified, point-in-time after the consistent copy was made. The following embodiments, described in terms of DB2® database copy and recovery operations, are illustrative only and are not to be considered limiting in any respect.

Figure 1:
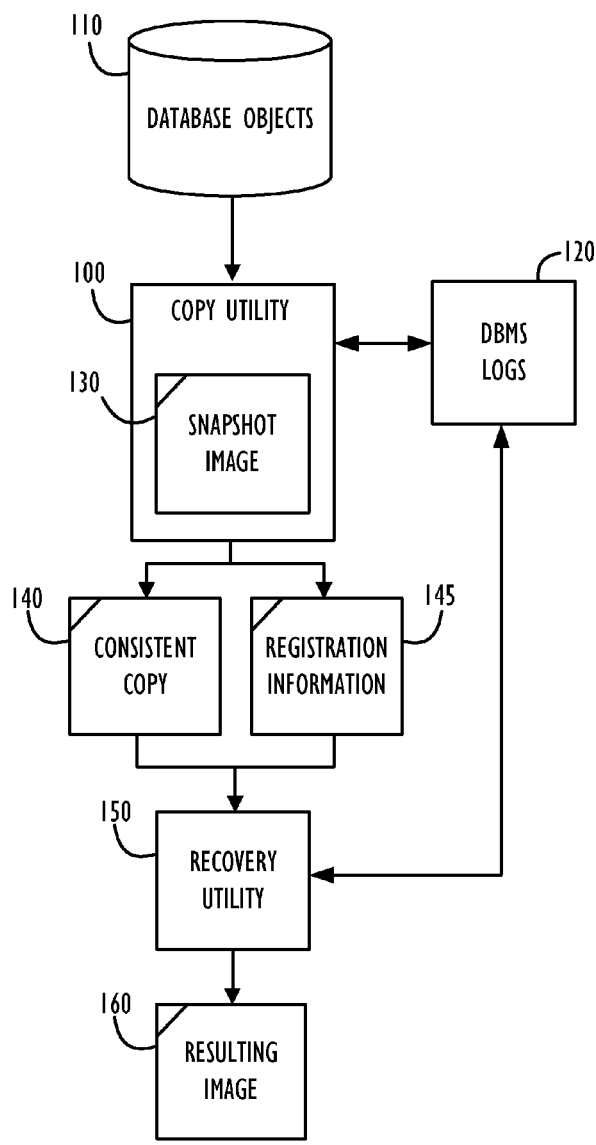
FIG. 1 illustrates copy and recovery process in accordance with one embodiment of the present disclosure.

Referring to FIG. 1, a copy and recovery process according to one embodiment is illustrated. In the process, a copy utility 100 makes a snapshot image 130 of target database objects 110. Using DBMS logs 120 and other techniques discussed below, the copy utility 100 makes the snapshot image physically and transactionally consistent to a point-in-time (i.e., a "consistent point") to produce a consistent copy 140. In one embodiment, operations of the copy utility 100 are substantially similar to the techniques disclosed in incorporated U.S. Pat. No. 7,133,884.

In addition to the consistent copy 140, the copy utility 100 also produces registration information 145 that is associated with the copy 140 and is used during recovery operations. At some point during subsequent processing, for example, a recovery utility 150 uses the consistent copy 140 along with the database log 120 and the associated registration information 145 to make a resulting image 160 that recovers the database objects to an identified recovery point (i.e., the current time or an arbitrary, but specified, point-in-time after the consistent copy 140 was made). The registration information 145 includes information that enables the recovery utility 150 to apply logs 120 to the consistent copy 140 in such a way that any transactions that were in-flight when the copy 140 was made will not be lost in the resulting image 160.

Figure 2:
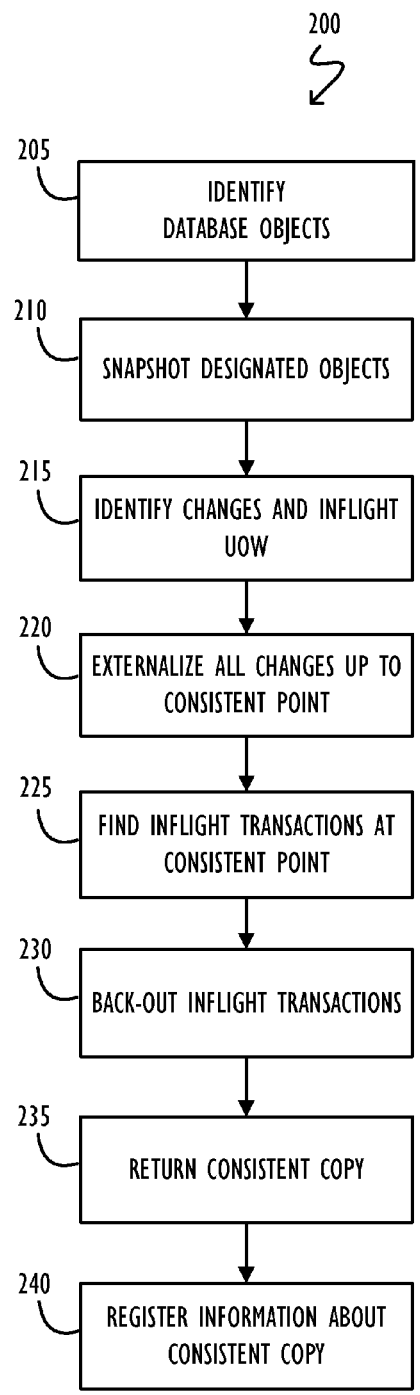
FIG. 2 illustrates one embodiment of a copy operation in flowchart form.

Referring to FIG. 2, one embodiment of a copy operation 200 is shown in flow chart form. This copy operation 200 can be used by the copy utility 100 of FIG. 1 to create the point-in-time consistent copy 140 of one or more target database objects 110 without impacting the target objects 110's availability to other users. Initially, the copy utility 100 identifies the one or more target objects 110 to be copied, including those objects related through referential or other constraints (Block 205). Then, the copy utility makes a snapshot image 130 of the identified objects 110 (Block 210).

Subsequently, the copy utility 100 processes the snapshot image 130 to make it physically and transactionally consistent to a consistent point-in-time (i.e., a "consistent point"). Initially, DBMS logs 120 are used to identify changes made to the objects 110 that are not yet reflected in external storage (and, therefore, not in the snapshot image 130) and to identify any in-flight transactions or Units of Work (UOW) as of the time the snapshot image 130 was made (Block 215). The copy utility 100 externalizes any identified changes (committed and un-committed) up to the consistent point to the snapshot image 130 (Block 220). In one embodiment, the identified changes may be sorted by the page or other allocated size of memory in which the change is to be made (where a page or other allocated size corresponds to a portion of an object). In this way, only those portions (e.g., pages) of memory that need to be updated are accessed and then, only once. It is further noted that, because entries of the DBMS log 120 are applied directly against the snapshot image 130, there is no interference with the source data set from which the target objects 110 have been copied.

Next, the copy utility 100 removes ("backs out") from the snapshot image 130 those updates associated with in-flight transactions/UOWs at the consistent point (Block 225). As a result of these operations, the copy utility 100 returns a consistent copy 140 of the database objects 110 that is physically and transactionally consistent to the consistent point (Block 230). The copy utility 100 also registers information 145 about the consistent copy 140 (Block 235). As discussed in more detail later, the recovery utility 150 uses the registered information 145 later when applying log records to recover the copy 140 to an identified recovery point after the copy 140 was made so as not to lose any transactions that may have been in-flight at the consistent point when the copy 140 was made.

With respect to the acts of Blocks 205 and 210, both tablespaces and indexes may be copied in accordance with the disclosed copy operations. With respect to the acts of Block 210, snapshots preferably utilize intelligent storage devices as they permit complete copies of a data set in a few seconds, regardless of the size of the objects being copied. One illustrative application that makes use of such intelligent storage devices and which is suitable for use with the present invention is COPY PLUS for DB2® by BMC Software, Inc. together with the SNAPSHOT UPGRADE FEATURE for DB2® by BMC Software, Inc. of Houston, Tex. Whatever technique is used to create an image of the targeted database object(s), the image must be of a type against which DBMS log records may be applied. It will be recognized by one of ordinary skill in the art that such an image may be created in one step (e.g., through the use of intelligent storage devices), or through a series of steps, only the last one of which creates a copy against which database log file entries may be applied. In a DB2 ® embodiment, the image created in accordance with the acts of Block 210 is a SHRLEVEL CHANGE snapshot. It is significant to note that the acts of Block 210 generate a point-in-time image of the targeted database objects 110 as they exist on the storage device or system. Thus, the image 130 may contain uncommitted changes to the target objects 110. In addition, they may not contain committed changes if such changes still reside in buffer pool storage associated with the DBMS.

Figure 3:
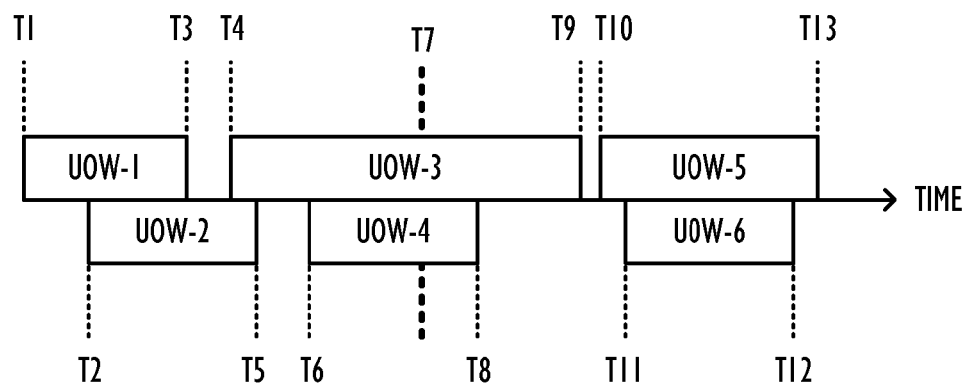
FIG. 3 illustrates an example of overlapping and in-flight units of work.

The difficulty with, and the need to resolve in-flight transactions/UOW to make the consistent copy 140 may be seen diagrammatically in FIG. 3. As shown, each UOW begins and ends at a different time (recall, a UOW is a group of database updates related to a single logical transaction). If, for example, the copy utility 100 is invoked and if the snapshot image 130 in accordance with Block 210 has been created at time T7, both UOW-3 and UOW-4 are "in-flight." Thus, some, but not all, updates associated with each of UOW 3 and 4 have been made to the image 130. To make the snapshot image 130 transactionally consistent as of T7, it is necessary to remove or back-out those updates associated with both UOW-3 and UOW-4 made prior to time T7. To maintain physical consistency during the acts of Block 230, however, those updates associated with structural changes to the target database objects 110 are not backed-out even if the update that necessitated the structural change was backed-out. For example, space allocation updates are not removed even if the change that triggered the structural update was removed. An illustrative structural change is an index page split.

By way of example, a DB2 ® embodiment of the copy utility 100 can interrogate checkpoint records within the DBMS logs 120 to identify in-flight transactions/UOW and can also interrogate control blocks maintained by the DBMS in working memory to identify the earliest time at which changes to the targeted database objects 110 have not been written to long-term storage. Starting at the identified time, each log entry is checked to see if it has been pushed into the database (and, therefore, into the snapshot image 130). If the log entry has not been applied, the update is externalized to the snapshot image 130. If the log entry has been applied, the current log entry is skipped, and the next log entry is evaluated.

As noted previously in the acts of Block 240, the copy utility 100 also generates registration information 145 when generating the consistent copy 120 and associates that information 145 with the copy 140. This registration information 145 enables the recovery utility 150 to effectively use the consistent copy 140 to recover to an identified recovery point (e.g., the current time or to an arbitrary, but specified, point-in-time after the copy 140 was made) without losing in-flight transactions that may have existed at the consistent point.

Figure 4:
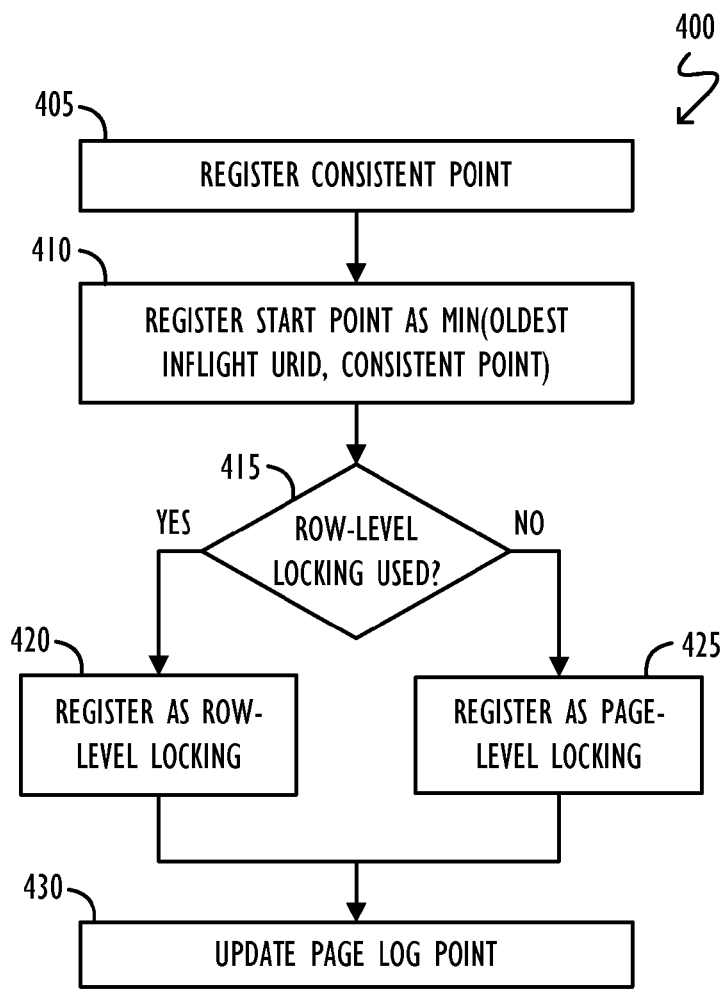
FIG. 4 illustrates one embodiment of registration procedures performed during the copy operation of FIG. 2.

To generate the registration information 145, the copy utility 100 performs registration procedures 400 shown in FIG. 4. In a first procedure 405, the copy utility 100 registers the consistent point when the copy 140 was made. In one embodiment, for example, the consistent point can be stored as a relative byte address (RBA) in a column of a registration table that is associated with the consistent copy 140. In one embodiment, the registration table can be a DB2 table called BMC COPY, which is similar to the existing SYSCOPY table in DB2 that stores information in rows for each image copy made.

In a second procedure 410, the copy utility 100 registers a starting point from which future DBMS logs 120 should be applied to the consistent copy 140. For example, the starting point can be stored as a relative byte address in another column of the registration entry or table associated with the consistent copy 140. If the starting point for applying logs 120 were simply to be registered as the relative byte address (RBA) of the consistent point of the consistent copy 140, then using normal log apply with such a starting point may result in losing any changes made by in-flight transactions around the consistent point. Therefore, the starting point for applying logs is registered as whichever point-in-time is earliest of either (a) the consistent point or (b) the unit of recovery ID (URID) of the oldest in-flight transaction. By convention, the URID is the Log RBA of the beginning of the oldest in-flight transaction. Thus, if there are no in-flight transactions older than the consistent point, then the registered starting point will simply be the consistent point because there will be no potential for losing any in-flight transactions. However, if any in-flight transactions are older than the consistent point, then the registered starting point for applying logs 120 will be the URID for the oldest in-flight transaction. Accordingly, log records 120 will be applied in a recovery operation from this starting point so as not to potentially loose any of the in-flight transactions that were backed out of the consistent copy 140.

Looking again at FIG. 3, for example, the consistent point is T7 when the consistent copy 140 was made, but the oldest in-flight transaction is UOW-3. Therefore, in this example, the starting point registered for applying DBMS logs 120 would be the URID for the oldest in-flight transaction (e.g., UOW-3). Starting log apply operations at this point will allow the changes made by the in-flight transactions (i.e., UOW-3 and -4) to be processed with the recovery utility 150 without being lost. In addition, this starting point for log apply operations can also simplify recovery and can allow a recovery utility that is unaware of consistent copies to use the consistent copy 140 in many cases.

Additional procedures 415 through 425 of the copy utility 100 register a lock size in the table or entry of registration information 145 associated with the consistent copy 140. As discussed in Block 230 of FIG. 2, the copy utility 100 backs out any updates made by in-flight transactions at the consistent point. Since these transactions are in-flight, the changes are protected by locks. In general, the locks can be placed on specific rows, on data pages, or on entire tables of the target database objects 110. Because the consistent copy 140 can be used for recovery with log apply, it is useful to know the size of the locks used to protect the data that has actually been backed out by the copy utility 100. Accordingly, the copy utility 100 when making the consistent copy 140 saves the smallest lock size used for blocking access to the target objects 110 when backing out in-flight transactions.

In one embodiment, the lock size is determined from the log records in the DBMS log 120 that are used to back-out the in-flight transactions, and the smallest lock size encountered is stored in the registration entry or table associated with the consistent copy 140. For example, the copy utility 100 determines whether row-level locking was used when backing out in-flight transactions (Decision 415). If so, then row-level locking is registered in the registration entry or table (Block 420). Otherwise, page-level locking or at least a greater locking level is registered (Block 425). Registering the lock size in this way can make recovery more efficient in many cases. One of ordinary skill in the art will recognize that the inventive technique may be used with systems employing more than two lock sizes.

As a final procedure 430, the copy utility 100 updates the page log point when changes made by in-flight transactions are backed out. For example, each page in the copy 140 contains a page log point that indicates the last time the page was updated. During operation of the copy utility 100, for each page that contains changes that are backed out, the page log point is updated to indicate the last time that the page was updated. In one embodiment of the copy utility 100, this log point is set to the log point for the first log record for the page that has not been backed out according to the acts of Block 230 (FIG. 2), if such a log record exists. Such a log point would be in a range between the starting point and the consistent point. Using this log point ensures that during recovery with page-level locking (Block 425), log records for committed transactions in the range between the starting point and the consistent point will not be reapplied by the recovery utility 150.

Figure 5:
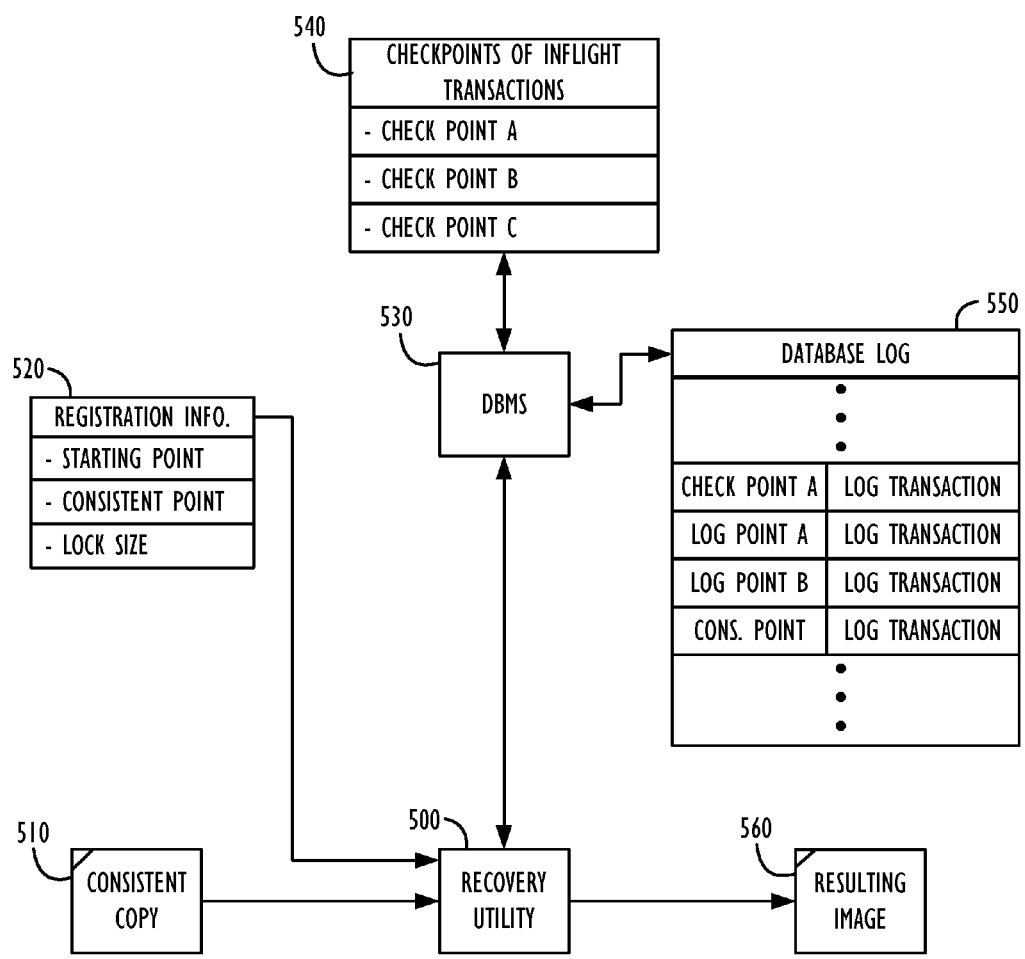
FIG. 5 illustrates a recovery utility and other components in accordance with one embodiment of the present disclosure.

With an understanding of how the consistent copy 140 and associated registration information 145 are made, we now turn to FIG. 5 to discuss a recovery utility 500 in accordance with one embodiment. As shown, the recovery utility 500 applies DBMS logs 550 to a consistent copy 510 to make a resulting image 560 that recovers target database objects (not shown) in the copy 510 to an identified point after the copy 510 was made. To do this effectively, the recovery utility 500 uses the registration information 520 associated with the copy 510. As shown and discussed previously, the registration information 520 includes the starting point, consistent point, and lock size used, and the recovery utility 500 uses this information 520 to ensure that any changes that were in-flight at the consistent point when the copy 510 was made are not lost when the DBMS logs 550 are applied.

Figure 6:
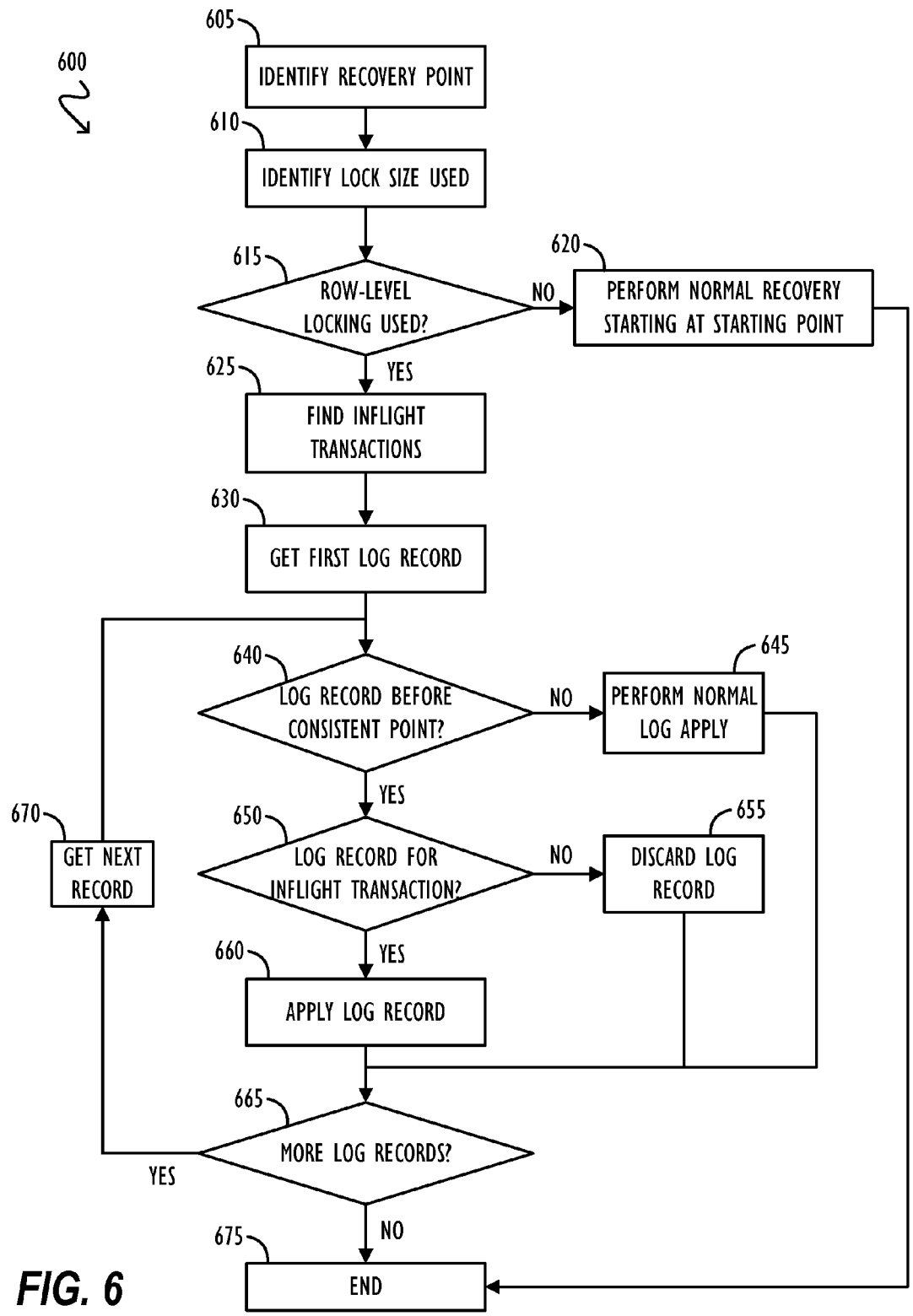
FIG. 6 illustrates one embodiment of a recovery operation in flowchart form.

One embodiment of a recovery operation 600 is shown in flow chart form in FIG. 6. Initially, the recovery utility 500 identifies a "recovery point" (i.e., the current point or an arbitrary, but specified, point-in-time after the copy 510 was made) to which the database objects are to be recovered (Block 605). Next, the recovery utility 500 identifies the registered lock size from the information 520 associated with the copy 510 (Block 610). Using the identified lock size, the recovery utility 500 determines whether row-level locking was the smallest lock size used to block access to data when backing out in-flight transactions when the copy 510 was made (Decision 615). If none of the in-flight transactions used row-level locking, then the locking granularity must have been at least greater than row-level (i.e., at least at the page level).

With respect to locking, DB2 is configured to hold a given lock during an update until the update transaction is finished in the event some error or failure occurs. Due to this property in DB2, no other user can access the held lock. If locking is at least at the page level, therefore, a page updated by an in-flight transaction could not have been updated by other transactions in the range between the first update by the in-flight transaction and the consistent point. In this situation, the recovery utility 500 applies DBMS logs 550 according to a normal recovery process by starting at the registered starting point and recovering to the identified recovery point (Block 620). Because page-level locking is common, recovery by applying the DBMS logs 550 in this normal recovery process may not require additional overhead. In addition, existing recovery utilities that are unaware of any special properties of the consistent copy 510 may be able to perform this recovery process without needing modification to accommodate the special properties of the consistent copy 510.

If row-level locking has been used for in-flight transactions backed out from the copy 510 (Decision 615), then it is possible that one or more committed updates to a page made by other transactions could have occurred between the first (oldest) update by an in-flight transaction and the consistent point. Consequently, the normal recovery process (Block 620) is preferably not used because this process could lose updates or attempt to reapply committed updates, which could result in errors.

Briefly, the operation 600 determines whether a given log record in the DBMS logs 550 corresponds to an in-flight transaction in the range between the starting point and the consistent point. If the log record corresponds to an in-flight transaction in this range, that log record should be applied to the consistent copy 510 to create the resulting image 560. If the log record corresponds to a committed transaction in this range, the log record should not be applied because the change is already in the copy 510.

In accord with the above principles, the recovery utility 500 first finds the in-flight transactions (Block 625). One way to find in-flight transaction involves registering and storing a list of all the in-flight transactions when the copy 510 was made. Such a list can be part of the registration information 520 associated with the consistent copy 510. In another approach, the recovery utility 500 uses the DBMS 530 to determine which log records in the DBMS log 550 correspond to in-flight transactions. Because the logs in the DBMS log 550 typically record the beginning and ending times of each transaction, the transactions that are in-flight at the time the copy 510 was created can be determined by scanning the log 550 and comparing the transaction times to the starting point and consistent point in the registration information 520.

Preferably, the recovery utility 500 takes advantage of checkpoints already maintained by the DBMS 530. Periodically, the DBMS 530 takes checkpoints of all transactions that are in-flight and maintains a list 540 of the log points corresponding to these checkpoints. The recovery utility 500 uses the DBMS 530 to determine what is the first checkpoint in the list 540 (e.g., "Check Point A") that is before the consistent point (e.g., "Consistent Point" in the registration information 520). The recovery utility 500 can then scan the log 550 from the first checkpoint ("Check Point A") to the consistent point ("Consistent Point") to find all the in-flight transactions based on their transaction times. Advantageously, this technique does not require additional information about in-flight transactions to be registered and stored. It also introduces less overhead than just performing a straight search the DBMS log 550 because only a relatively small amount of the DBMS log 550 between the last checkpoint ("Check Point A) and the consistent point ("Consistent Point") must be read and searched.

With those log records for the in-flight transactions determined, the recovery utility 500 processes a plurality of log records from the DBMS log 550 through Blocks 615 to 650 and applies them to the copy 510 to make the resulting image 560 that recovers the target objects to the identified point. Initially, the recovery utility 500 gets the first log record to be applied (Block 630) and determines if it is before the consistent point (Decision 640). If not, the recovery utility 500 can perform normal log apply (Block 645) and continues processing, because this log record is not for a backed out in-flight transaction that would have been initiated between the starting point and the consistent point.

If the log record is before the consistent point, however, the recovery utility 500 determines if the log record is for one of the in-flight transactions (Decision 650). If it is not, the utility 500 discards the log record (Block 655) and continues processing because this log record would have already been applied as part of the consistent copy 510. If the log record is for an in-flight transaction, the recovery utility 500 applies the log record to the consistent copy 510 to become part of the resulting image 560 because this log record was not previously applied to the consistent copy 510.

Processing repeats by determining if more log records are available (Decision 665), getting the next record (Block 670), and repeating the acts of Blocks 640 through 670 until all records have been processed. When the operation ends (Block 675), the resulting image 560 is produced and has the previous in-flight transactions applied to the consistent copy 510 and has log records subsequent to the consistent point and up to the identified point also applied. Although not strictly necessary, the recovery utility 500 can use similar techniques as the copy utility 100 (see FIG. 1) discussed previously to make the resulting image 560 physically and transactionally consistent to the identified recovery point if desired.

BMC Software's Recovery Management for DB2 Solution is one software tool suitable for generating consistent copies in accordance with the present disclosure. However, other techniques and software tools could also be used. Acts in accordance with the disclosed copy and recovery utilities may be embodied in computer executable instructions, organized into one or more programs or routines. Storage devices suitable for tangibly embodying program instructions include, but are not limited to: magnetic disks (fixed, floppy, and removable) and tape; optical media such as CD-ROM disks; and semiconductor memory devices such as Electrically Programmable Read-Only Memory (EPROM), Electrically Erasable Programmable Read-Only Memory (EEPROM), Programmable Gate Arrays and flash devices. Computer instructions may be executed by a programmable control device. A programmable control device may be a single computer processor, a plurality of computer processors coupled by a communications link, or a custom designed state machine.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A database object recovery method, comprising:
obtaining with a programmable control device a copy of one or more source database objects from memory associated with the programmable control device, the copy being transactionally consistent as of a first point-in-time;
identifying with the programmable control device a second point-in-time subsequent to the first point-in-time;
determining with the programmable control device whether any in-flight transactions were backed out from the copy when it was made transactionally consistent; and
creating a resulting image by:
applying the in-flight transactions with the programmable control device to the copy if determined; and
applying one or more log records with the programmable control device to the copy from the first point-in-time up to the second point-in-time.

2. The database object recovery method of claim 1, wherein the act of creating the resulting image comprises making the resulting image transactionally consistent as of the second point-in-time.

3. The database object recovery method of claim 2, wherein the act of making the resulting image transactionally consistent further comprises making the resulting image physically consistent as of the second point-in-time.

4. The database object recovery method of claim 1, further comprising substituting the resulting image for the one or more source database objects in the database.

5. The database object recovery method of claim 1, wherein the act of obtaining the copy further comprises obtaining a starting point-in-time indicative of when log records should be applied to the copy.

6. The database object recovery method of claim 5, wherein the starting point-in-time comprises whichever point-in-time is earliest of either an oldest in-flight transaction backed out from the copy or the first point-in-time.

7. The database object recovery method of claim 5, wherein the act of determining comprises searching the log records based on the starting point-in-time for any in-flight transactions that have been backed out from the copy up to the first point-in-time.

8. The database object recovery method of claim 1, wherein the act of obtaining the copy further comprises obtaining a smallest lock size used to block access to at least a portion of the one or more source database objects when the copy was created.

9. The database object recovery method of claim 8, wherein the smallest lock size comprises a row-level locking size or at least a page-level locking size.

10. The database object recovery method of claim 8, wherein the act of determining whether any in- flight transactions were backed out comprises skipping the determination if the smallest lock size is at least greater than a row-level locking size, and wherein the act of applying the one or more log records comprises starting application of the one or more logs at a starting point, the starting point being whichever point-in-time is earliest of either an oldest in-flight transaction backed out from the copy or the first point-in-time.

11. The database object recovery method of claim 1, wherein the act of obtaining the copy comprises:
   identifying the one or more source database objects;
   creating a copy of the one or more source database objects at the first point-in-time; and
   making the copy transactionally consistent as of the first point-in-time by backing out any in-flight transactions.

12. The database object recovery method of claim 11, wherein the act of creating the copy comprises creating the copy in a manner that does not substantially block access to the one or more source database objects.

13. A non-transitory program storage device, readable by a programmable control device, comprising instructions stored therein for causing the programmable control device to perform the database object recovery method according to claim 1.

14. A database object recovery method, comprising:
   identifying with a programmable control device one or more source database objects in memory associated with the programmable control device;
   creating with the programmable control device a copy of the one or more source database objects at a first point-in-time;
   making the copy transactionally consistent as of the first point-in-time with the programmable control device;
   associating with the programmable control device a starting point-in-time with the copy, the starting point-in-time being indicative of when log records should be applied; and
   creating a resulting image of the copy recovered to a second point-in-time subsequent to the first point-in-time by applying with the programmable control device one or more log records to the copy from the starting point-in-time to the second point-in-time.

15. The database object recovery method of claim 14, wherein the starting point-in-time comprises whichever point-in-time is earliest of either an oldest in-flight transaction backed out from the copy or the first point-in-time.

16. The database object recovery method of claim 14, wherein the act of creating the resulting image comprises making the resulting image transactionally consistent as of the second point-in-time.

17. The database object recovery method of claim 14, further comprising associating a smallest lock size with the copy used to block access to at least a portion of the one or more source database objects when creating the copy.

18. The database object recovery method of claim 17, wherein the smallest lock size comprises a row-level locking size or at least a page-level locking size.

19. The database object recovery method of claim 17, further comprising determining if the smallest lock size is at least greater than a row-level locking size.

20. The database object recovery method of claim 19, wherein if the smallest lock size is not at least greater than the row-level locking size, the act of creating the resulting image comprises:
   searching the log records for any in-flight transactions that have been backed out from the copy;
   applying any backed out in-flight transactions found in the log records to the copy; and
   applying any additional one or more of the log records to the copy from the first point-in-time to the second point-in-time.

21. The database object recovery method of claim 14, wherein each page in the copy contains a page log point that indicates a last time the page was updated, and wherein the act of making the copy transactionally consistent comprises updating the page log point when a change made by an in-flight transaction is backed out.

22. A non-transitory program storage device, readable by a programmable control device, comprising instructions stored therein for causing the programmable control device to perform the database object recovery method according to claim 14.

23. A database object recovery method, comprising:
   identifying with a programmable control device one or more source database objects in memory associated with the programmable control device;
   creating with the programmable control device a copy of the one or more source database objects at a first point-in-time;
   making with the programmable control device the copy transactionally consistent as of the first point-in-time;
   associating with the programmable control device a smallest lock size with the copy, the smallest lock size being used to block access to at least a portion of the one or more source database objects when creating the copy; and
   creating a resulting image of the copy recovered to a second point-in-time subsequent to the first point-in-time by applying log records with the programmable control device to the copy based on the smallest lock size.

24. The database object recovery method of claim 23, wherein the smallest lock size comprises a row-level locking size or at least a page-level locking size.

25. The database object recovery method of claim 23, wherein the applying the log records to the copy based on the smallest lock size comprises determining if the smallest lock size is at least greater than a row-level locking size.

26. The database object recovery method of claim 25, wherein if the smallest lock size is at least greater than the row-level locking size, the act of creating the resulting image comprises applying one or more log records to the copy from a starting point-in-time to the second point-in-time, wherein the starting point-in-time comprises whichever point-in-time is earliest of either an oldest in-flight transaction backed out from the copy or the first point-in-time.

27. The database object recovery method of claim 23, wherein if the smallest lock size is not at least greater than a row-level locking size, the act of creating the resulting image comprises:
  searching log records for any in-flight transactions that have been backed out from the copy;
  applying any backed out in-flight transactions found in the log records to the copy; and
  applying any additional one or more of the log records from the first point-in-time to the second point-in-time.

28. The database object recovery method of claim 23, wherein the act of creating the resulting image comprises making the resulting image transactionally consistent as of the second point-in-time.

29. The database object recovery method of claim 23, further comprising associating a starting point-in-time with the copy indicative of when the log records should be applied.

30. The database object recovery method of claim 29, wherein the starting point-in-time comprises whichever point-in-time is earliest of either an oldest in-flight transaction backed out from the copy or the first point-in-time.

31. The database object recovery method of claim 29, wherein the act of creating the resulting image comprises applying one or more log records to the copy from the starting point-in-time to the second point-in-time.

32. A non-transitory program storage device, readable by a programmable control device, comprising instructions stored therein for causing the programmable control device to perform the database object recovery method according to claim 23.

33. A networked computer system comprising a plurality of computers communicatively coupled, at least one of the plurality of computers programmed to perform at least a portion of a database object recovery method, wherein the database object recovery method is performed collectively by the plurality of computers, and wherein the database object recovery method comprises:
  obtaining a copy of one or more source database objects transactionally consistent as of a first point-in-time;
  identifying a second point-in-time subsequent to the first point-in-time;
  determining whether any in-flight transactions were backed out from the copy when it was made transactionally consistent; and
  creating a resulting image by:
    applying the in-flight transactions to the copy if determined; and
    applying one or more log records to the copy from the first point-in-time up to the second point-in-time.

34. A networked computer system comprising a plurality of computers communicatively coupled, at least one of the plurality of computers programmed to perform at least a portion of a database object recovery method, wherein the database object recovery method is performed collectively by the plurality of computers, and wherein the database object recovery method comprises:
  identifying one or more source database objects;
  creating a copy of the one or more source database objects at a first point-in-time;
  making the copy transactionally consistent as of the first point-in-time;
  associating a starting point-in-time with the copy indicative of when log records should be applied; and
  creating a resulting image of the copy recovered to a second point-in-time subsequent to the first point-in-time by applying one or more log records to the copy from the starting point-in-time to the second point-in-time.

35. A networked computer system comprising a plurality of computers communicatively coupled, at least one of the plurality of computers programmed to perform at least a portion of a database object recovery method, wherein the database object recovery method is performed collectively by the plurality of computers, and wherein the database object recovery method comprises:
  identifying one or more source database objects;
  creating a copy of the one or more source database objects at a first point-in-time;
  making the copy transactionally consistent as of the first point-in-time;
  associating a smallest lock size with the copy used to block access to at least a portion of the one or more source database objects when creating the copy; and
  creating a resulting image of the copy recovered to a second point-in-time subsequent to the first point-in-time by applying log records to the copy based on the smallest lock size.

* * * * *

UNITED STATES PATENT AND TRADEMARK OFFICE
CERTIFICATE OF CORRECTION

| | | |
|---|---|---|
| PATENT NO. | : 8,671,076 B2 | Page 1 of 1 |
| APPLICATION NO. | : 11/745971 | |
| DATED | : March 11, 2014 | |
| INVENTOR(S) | : Price et al. | |

It is certified that error appears in the above-identified patent and that said Letters Patent is hereby corrected as shown below:

In the Claim

Column 9, line 35, in claim 10, delete "in- flight" and insert -- in-flight --, therefor.

Signed and Sealed this
Twenty-seventh Day of May, 2014

Michelle K. Lee
*Deputy Director of the United States Patent and Trademark Office*